Patented Sept. 1, 1931

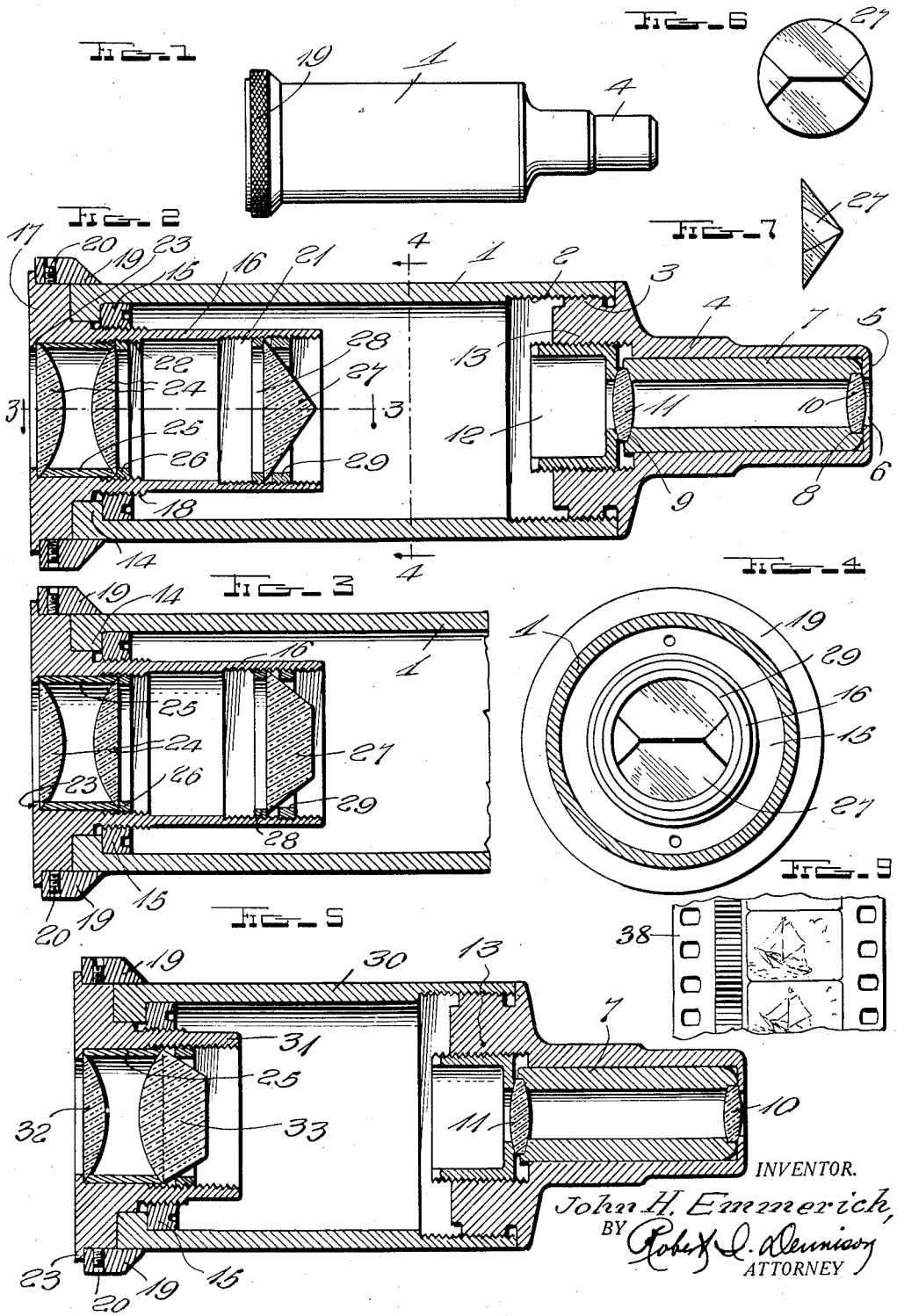

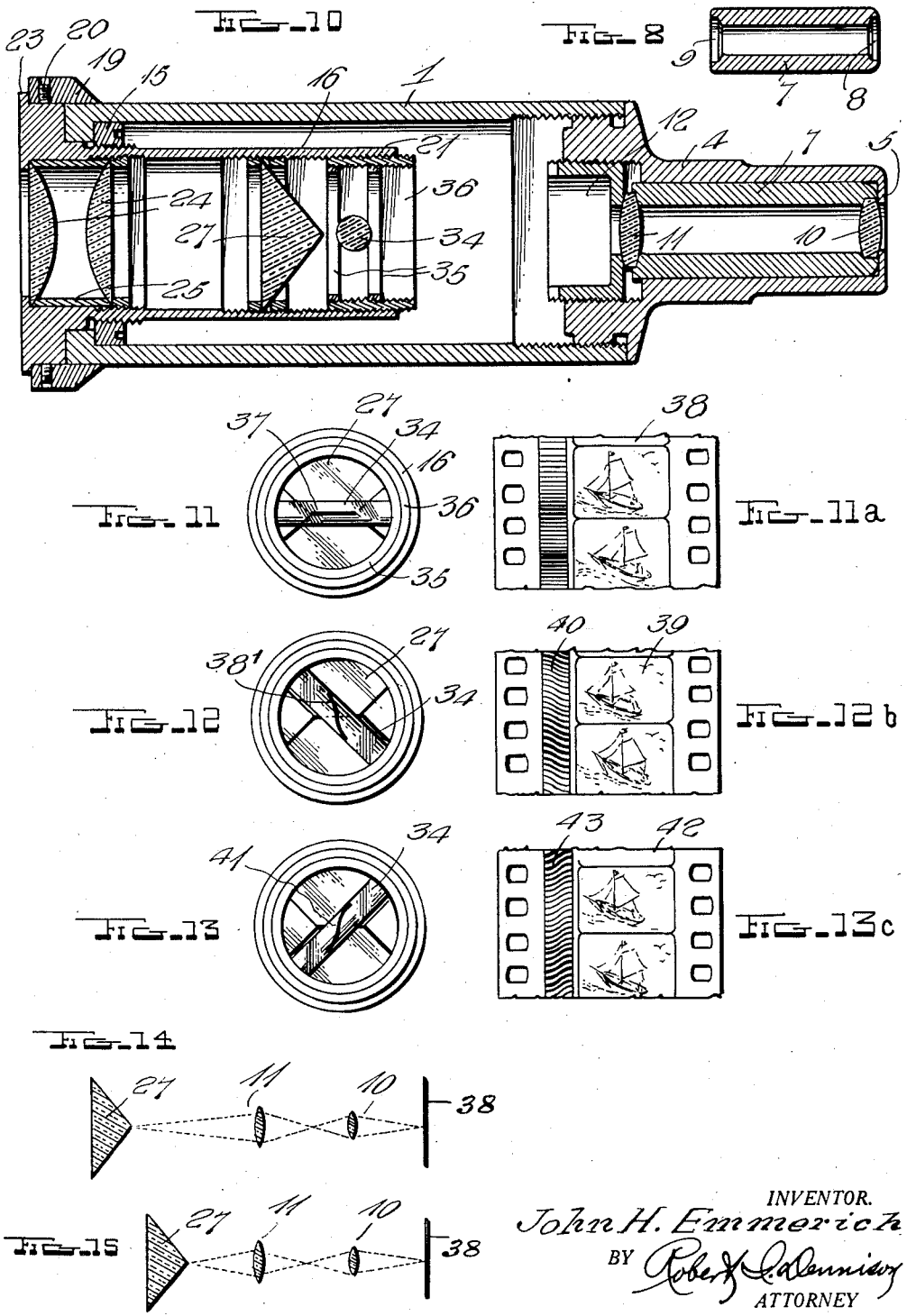

1,821,623

UNITED STATES PATENT OFFICE

JOHN H. EMMERICH, OF ROSEDALE, NEW YORK, ASSIGNOR TO HAROLD S. HOLMES, OF NEW YORK, N. Y.

LIGHT CONDENSING OPTICAL SYSTEM

Application filed April 13, 1931. Serial No. 529,837.

My invention relates to new and useful improvements in the art of optics and more particularly to an optical system for condensing light rays, the primary object being to provide a system, capable of minute adjustments, whereby beams of light may be condensed to various predetermined areas and shapes or configurations.

A further object of the invention resides in providing an optical system wherein a prismatic lens is used in association with condenser and objective lens combinations to condense light beams as may be required.

Still another object resides in providing for adjustment of the prismatic and condenser lenses with relation one to the other in order to provide for the increasing or decreasing of the ray of light condensed from the beam through said lenses.

Still another object of the invention resides in the provision of means in association with the prismatic lens to provide for changing the contour of the ray of light condensed from the beam of light through the medium of said prismatic lens.

A still further object resides in the provision in an optical system of the class described of a combined condenser and prismatic lens.

A still further object resides in the provision of improved means for mounting objective lenses, or other small lenses, without the use of adhesives or the like which in the removal of such lenses so mounted frequently cause destruction of such lenses.

A still further object resides in the provision of a unit comprising the system of arrangement and adjustability of lens combination which is simple in construction, comparatively inexpensive to manufacture and one which will prove most efficient and valuable in use.

With these and numerous other objects in view, my invention consists in the novel features of construction, combination and arrangement of parts as will be hereinafter referred to and more particularly pointed out in the specification and claims.

In the accompanying drawings forming a part of this application.

Figure 1 is a side elevation of a light concentrating tube in which is disposed the various lenses constituting my improved system.

Figure 2 is an enlarged vertical section therethrough.

Figure 3 is a detail longitudinal section through Figure 2 as seen on the line 3—3 of Figure 2.

Figure 4 is a vertical transverse section as seen on the line 4—4 of Figure 2.

Figure 5 is an enlarged longitudinal section through the device showing a slight modification of the prismatic lens and illustrating in detail the combination condenser and prismatic lens, same being taken on the same plane as Figure 3.

Figure 6 is a front elevation of my improved pyramidal prismatic lens.

Figure 7 is a side elevation thereof.

Figure 8 is a detail longitudinal section of the inner sleeve for supporting the objective lenses in the tube.

Figure 9 is a fragmentary elevation of a film showing a sound track thereon with lines such as are produced on such film when the sound photographed thereon through my improved apparatus and the type of lines which are used for reproducing sound through my improved apparatus.

Figure 10 is an enlarged vertical longitudinal section through a slightly modified form of the invention, wherein a cylindrical quartz or glass lens is utilized in association with the prismatic lens.

Figure 11 is a front elevation of the inner portion of the lens tube illustrating the quartz or glass lens in association with the prismatic lens disclosing a horizontal light beam when the quartz or glass cylinder is in horizontal position.

Figure 11a is a fragmentary elevation of a film showing the character of lines in the sound track thereof which will be produced thereon when my improved apparatus is used for recording purposes and conversely the character of lines to be used in my improved device such as illustrated in Figure 11 when the device is utilized for reproducing purposes.

Figure 12 is a view similar to Figure 11 with the cylinder obliquely disposed with respect to the prismatic lens.

Figure 12b is a fragmentary elevation of a sound film showing a sound track with lines thereon such as would be produced by the apparatus when in position as disclosed in Figure 12 and conversely the position of my improved device such as to reproduce from a film with lines as disclosed in Figure 12b.

Figure 13 is a view similar to Figure 12 with the quartz cylindrical lens disposed at an angle 90° with respect to the angle of the rod as shown in Figure 12 and illustrating therein the contour of the ray of light such as produced through the lens combination when the cylindrical lens is so disposed.

Figure 13c is a view similar to Figure 12b showing thereon the character of lines on the film produced through the photographing with a lens combination positioned as shown in Figure 13.

Figure 14 is a diagrammatic view illustrating the relationship of the prismatic lenses, the objective lenses and the objective, and Figure 15 is a similar view showing the prismatic lens adjusted with respect to said objective lenses, such as may be necessary under varied conditions.

In describing the invention I shall refer to the drawings in which similar reference characters designate corresponding parts throughout the several views and in which 1 designates a cylindrical tube or body, the outer end of which is internally threaded as shown at 2 to receive in engagement therewith the externally threaded inner end 3 of an outer barrel or the like 4, the latter being reduced in diameter considerably with respect to the body 1. This barrel 4 has its outer end bent inwardly to provide an annular flange 5 which surrounds an opening 6.

This barrel 4 receives therein a sleeve 7 the ends of which are countersunk to provide outer and inner end seats 8 and 9, respectively, which are adapted to receive therein the outer and inner objective lenses 10 and 11, respectively. The outer objective lens 10 is adapted to abut the annular flange 5 of the barrel 4 and is held in place by means of the sleeve 7, as clearly shown in Figure 2 of the drawings, while the inner objective lens 11, seated in the seat 9 at the inner end of the sleeve 7 is adapted to be held in place by means of an externally threaded sleeve member 12 which engages an internally threaded end 13 of the barrel 4. It will be seen from this construction that the objective lenses 10 and 11 are securely held in their respective positions by means of elements which are capable of being readily removed but no adhesives or other fastening substances are used when it is desired to remove said lenses for cleansing purposes or replacement for whatever purposes may be desired there is no danger of damage to said lenses.

The inner end of the body 1 or the end opposed to that carrying the barrel 4 is provided with an annular inwardly projecting flange 14 and disposed within said body 1 in abutting relation with respect to the inner wall of said flange 14 is a collar 15 which is internally threaded. A hollow cylindrical shape lens supporting member 16 is provided which has its outer end provided with an annular outwardly projecting flange 17 which is adapted to abut the inner peripheral edge of the body 1 so that the greater portion of said member 16 will project inwardly of the body 1, as clearly shown in Figures 2 and 3 of the drawings. The cylindrical member 16 is externally threaded adjacent its outer end as shown at 18 for engagement with the threaded collar 15 so that when said member 16 is properly engaged with the collar it is held against longitudinal movement within the body 1 but is capable of rotary movement with respect thereto. In order to permit ready rotation of said member 16, I provide an externally knurled collar 19 which is secured to the peripheral edge of the portion 17 of the member 16 through the medium of set screw 20. Obviously, this permits a finger hold to readily rotate the cylinder 13 and its adjunctive parts within the body 1.

The hollow cylindrical member 16, as stated, is adapted to support lenses, and in carrying out the purpose for which this is designed, the member 16 is internally threaded as shown at 21 adjacent its innermost end. Spaced from the threads 21 and intermediate of the ends of said member 16 is a second internally threaded portion 22. The inner periphery of the member 21 at its outer end is provided with an internally extending annular flange 23 which may be said to be an abutting flange. One of a pair of condensing lenses 24 is adapted to be placed in abutting relation with the flange 23. A collar or sleeve 25 is placed in the member 16 to retain the first mentioned lens 24 in position and a second condensing lens similar to the one just referred to is brought in abutting relation with the opposite end of the sleeve or collar 25, the same being held in this position by means or a narrow externally threaded collar 26 which engages the threads 22. I have shown in Figures 2 and 3 the condensing lenses 24 arranged so that the convex faces thereof are in inwardly opposed positions but I may state at this time that the same may be reversed so that they are in outer opposed relation.

One of the essential features of my invention is the utilization of a pyramidal prismatic lens and I have shown this lens and designated the same under the numeral 26. This lens 26 is adapted to be supported adjacent the end of the member 16 opposed to that carrying the condenser lenses 27 and is held in place between two externally threaded collar members 28 and 29 which are engaged with the threaded portion 21 of the cylindrical member 16. This is clearly shown in Figures 2 and 3 of the drawings, Figure 3 being a position of the elements at right angles to the position disclosed.

As stated previously, the condenser lenses 24 are capable of adjustment or positioning oppositely from that disclosed in Figures 2 and 3. In other words, the convex faces thereof may be disposed outwardly with respect to one another. Also the pyramidal prismatic lens 27 is capable of positioning in a reverse direction. When the condenser lenses are reversed, the pyramidal prismatic lens is likewise reversed.

In cutting the pyramidal prismatic lens, I prefer to cut the facets so that total reflection takes place and the edge from which the ray of light is projected therefrom becomes substantially the focal point. However, I do not wish to be limited to this particular construction since it is possible to mirror the flat faces of the pyramidal prismatic lens for reflection purposes if desired.

In Figure 5, I have shown a slightly modified form of the invention wherein the barrel or body 30 is shortened although otherwise it is similar to the body 1. The hollow cylindrical member 31 which is mounted within the body 30 is similar to the member 16 in the above described form except that it is shorter. The reason for the shortening of the element is that a combined condenser and pyramidal prismatic lens is used. The numeral 32 represents one of the condenser lenses. The numeral 33 designates a combined pyramidal prismatic and condenser lens. As will be seen from Figure 5, the rear face of the lens 33 is a condenser lens corresponding in shape to the condenser lens 32. The front portion of the lens 33 is pyramidal prismatic in design. Otherwise, this device is the same as that hereabove described.

In Figure 10, I have shown a still further modified form of the invention, but this modification merely involves the addition of another element to the device shown in Figures 2 and 3. For convenience, therefore, the same numerals are applied to the elements in Figure 10 as appear in Figures 2 and 3 and I shall refer in detail herebelow to the added feature.

This added feature involves the use of a cylindrical quartz lens 34. This quartz lens is held between a pair of collars 35 which are externally threaded and engaged with the internal threads of a sleeve 36 which is both internally and externally threaded, the external threads of said sleeve 36 being engaged with the threaded portion 21 of the lens supporting tubular member 16. Obviously, from this construction it will be observed that the cylindrical lens 34 is capable of adjustment with respect to the pyramidal prismatic lens 27. When the cylindrical lens is moved a greater distance from the prismatic lens, the line or ray of light projected therefrom will be enlarged and when brought closer to the focal point of the prismatic lens, the line will obviously be narrowed. It will be seen that the line or ray of light in the form of a line will be projected from the cylindrical lens 34. When this cylindrical lens 34 is in the same horizontal plane with the edge of the prismatic lens 27, as shown in Figures 10 and 11 of the drawings, the ray of light projected therefrom will be horizontal and in the form of a line such as shown by the numeral 37. When the cylindrical lens 34 is adjusted to different angles with respect to the focal point of the lens 27, different forms or configurations of light rays will be projected therefrom.

As stated, previously, my optical system is adapted to be used in connection with the recording of sound on motion picture film, and the reproduction of sound from such film. When the cylindrical lens is positioned as shown in Figure 11, horizontal lines may be recorded on a film 38 such as shown in Figure 11a in the drawings.

Likewise when a film such as shown in Figure 11a is to be reproduced, an arrangement of the optical system as shown in Figure 11 is necessary when my apparatus is used.

An important feature of my invention, however, is the production on film of a sound track with lines which are not horizontal but are compoundly curved so that in the reproduction of such film with a sound track having compoundly curved lines, the use of my improved apparatus is necessary. This may be accomplished by the adjustment of my cylindrical lens 34 to different positions. For instance, in Figure 12 I have shown the cylindrical lens 34 at an angle of substantially 45 degrees to the horizontal plane of the edge of the prismatic lens 27. At this particular angle shown in Figure 12, the ray of light projected therefrom will take the configuration as shown by the line designated under the numeral 38'. It will form lines on the film 39 such as shown by the numeral 40, in Figure 12b. When the cylindrical lens 34 is disposed to the angle as shown in Figure 13, that is, at an angle substantially at right angles to the plane of the cylindrical lens as shown in Figure 12, the ray of light will take the configuration as shown in the line designated by the numeral 41 and the lines formed on the sound track of the film 42 will be in the form as shown by the numeral 43 in Figure 13c. Obviously, when film such as shown in Figures 12b and 13c is used, it becomes necessary to adjust the lenses respectively in the manner disclosed in Figures 12 and 13 in order to reproduce the sound. This is a very important feature of my invention since it prevents interchanging of film with the machine. When lines are produced on the sound track of the compound nature as shown in Figures 12b and 13c, it is obvious that the device must be used in the production of the machine which will register with such lines. Hence, only such a device as disclosed in Figures 10 to 13, inclusive, that is with the cylindrical quartz lens in association with the other elements may be used to accomplish the desired result. In this way, the manufacturer of film may control the device which I have invented insofar as its sale and use are concerned and vice versa.

From the foregoing description of my improved optical system, the method of assembling and applying same to use will be readily understood and it will be seen that I have provided a simple, comparatively inexpensive and most efficient means for carrying out the various and numerous objects of the invention.

While I have particularly described the elements best adapted to perform the functions set forth, it is obvious that various changes in forms, proportion and in the minor details of construction may be resorted to, without departing from the spirit or sacrificing any of the principles of the invention.

Having thus described the invention, what I claim is:

1. In a light concentrating system, a hollow body, a condenser lens mounted therein, a pyramidal prismatic lens adjustably mounted in said body in advance of the condenser lens and an objective lens mounted in said body, means for adjusting said pyramidal prismatic lens within said body.

2. In a light concentrating system, a pair of condenser lenses mounted for longitudinal adjustment within a hollow body, a pyramidal prismatic lens mounted for adjustment within said body in advance of said condenser lenses means for rotatably and longitudinally adjusting said pyramidal prismatic lens and a pair of objective lenses removably mounted in said body forward of said prismatic lens.

3. A light concentrating system including a hollow body, a combined unitary spherical condenser and pyramidal prismatic lens adjustably mounted therein and objective lenses mounted in said body in advance of the last mentioned lens.

4. In a light concentrating system, a hollow body having a reduced forward end portion thereon, forming a barrel, a condenser lens mounted in said hollow body, a pyramidal prismatic lens adjustably mounted in said body in advance of said condenser lens, means for adjusting said pyramidal prismatic lens within said body a tubular body mounted in said barrel having lens seats formed in the ends thereof, objective lenses loosely mounted in said seats and means for removably locking said tubular member in said barrel and simultaneously locking said lenses in their respective seats.

5. In a light concentrating system, a hollow body, a condenser lens mounted therein, a pyramidal prismatic lens therein, an objective lens mounted in the body in advance of the prismatic lens and means intermediate of the prismatic and objective lenses for distorting the concentrated ray of light projected from the prismatic lens.

6. In a light concentrating system, a hollow body, a condenser lens mounted therein, a pyramidal prismatic lens therein, an objective lens mounted in the body in advance of the prismatic lens, ray distorting means adjustably mounted within said body intermediate of said prismatic and objective lenses and means for adjusting said ray distorting means for variously distorting the ray of concentrated light projected from said prismatic lens.

7. In a light concentrating system, a hollow body, a condenser lens mounted therein, a pyramidal prismatic lens therein, an objective lens mounted in the body in advance of the prismatic lens and a cylindrical lens adjustably mounted within said body intermediate of said prismatic and objective lenses for variously distorting the concentrated ray of light projected from said prismatic lens.

8. In a light concentrating system, a hollow body, a condenser lens mounted therein, a pyramidal prismatic lens adjustably mounted in said body in advance of the condenser lens, an objective lens within the body in advance of said prismatic lens and means for adjusting said pyramidal prismatic lens longitudinally within the body and with respect to said objective lens.

In testimony whereof I affix my signature.

JOHN H. EMMERICH.